US011927329B2

(12) United States Patent
Walker

(10) Patent No.: US 11,927,329 B2
(45) Date of Patent: Mar. 12, 2024

(54) SYSTEM AND METHOD FOR A MAGNETIC CLIP

(71) Applicant: William Matthew Walker, Gallatin, TX (US)

(72) Inventor: William Matthew Walker, Gallatin, TX (US)

( * ) Notice: Subject to any disclaimer, the term of this patent is extended or adjusted under 35 U.S.C. 154(b) by 0 days.

(21) Appl. No.: 17/888,280

(22) Filed: Aug. 15, 2022

(65) Prior Publication Data

US 2023/0052090 A1 Feb. 16, 2023

Related U.S. Application Data

(60) Provisional application No. 63/233,124, filed on Aug. 13, 2021.

(51) Int. Cl.

| | |
|---|---|
| ***F21V 21/096*** | (2006.01) |
| ***B43K 23/06*** | (2006.01) |
| ***B43K 25/02*** | (2006.01) |
| ***B43K 29/10*** | (2006.01) |
| ***F21V 21/088*** | (2006.01) |
| ***F21V 21/14*** | (2006.01) |
| ***F21V 21/22*** | (2006.01) |

(Continued)

(52) U.S. Cl.

CPC ........ *F21V 21/0965* (2013.01); *B43K 25/026* (2013.01); *F21V 21/0885* (2013.01); *B43K 23/06* (2013.01); *B43K 29/10* (2013.01); *F21V 21/088* (2013.01); *F21V 21/096* (2013.01); *F21V 21/14* (2013.01); *F21V 21/145* (2013.01); *F21V 21/22* (2013.01); *F21V 21/26* (2013.01); *F21V 21/28* (2013.01); *F21V 21/29* (2013.01); *F21V 21/30* (2013.01)

(58) Field of Classification Search

CPC .. F21V 21/088; F21V 21/0885; F21V 21/096; F21V 21/0965; F21V 21/14; F21V 21/145; F21V 21/22; F21V 21/26; F21V 21/28; F21V 21/29; F21V 21/30; B43K 25/026; B43K 29/10; B43K 23/06

See application file for complete search history.

(56) References Cited

U.S. PATENT DOCUMENTS 2,594,955 A * 4/1952 Markowitz .......... B43K 23/001 D19/135
5,012,394 A * 4/1991 Woodward ............ F21V 21/145 362/198

(Continued)

FOREIGN PATENT DOCUMENTS

CN 202065768 U * 12/2011
DE 202020101084 U1 * 4/2020

OTHER PUBLICATIONS

Machine translation of CN 202065768 U retrieved from the FIT database of PE2E search. (Year: 2023).*

(Continued)

*Primary Examiner* — Colin J Cattanach
(74) *Attorney, Agent, or Firm* — Paul N Dunlap, Esq; Trendak IP Law LLC

(57) ABSTRACT

A system and method directed to a magnetic clip accessory that attaches to headwear such as a baseball cap where the magnetic clip includes a fastening clip, a body, a magnetic plate, a magnetic sleeve, a set of arms, whereby the magnetic clip provides attachment for miniature light and a sleeve and a tube for a writing utensil such as a pen.

17 Claims, 14 Drawing Sheets

(51) Int. Cl.

| | |
|---|---|
| ***F21V 21/26*** | (2006.01) |
| ***F21V 21/28*** | (2006.01) |
| ***F21V 21/29*** | (2006.01) |
| ***F21V 21/30*** | (2006.01) |

(56) References Cited

U.S. PATENT DOCUMENTS

| | | | | |
|---|---|---|---|---|
| D617,382 | S * | 6/2010 | Guirlinger | B43K 23/002 D19/83 |
| 8,235,262 | B1 * | 8/2012 | Sakdol | A42B 3/04 224/183 |
| 11,215,330 | B1 * | 1/2022 | Ross | F21L 4/022 |
| 2005/0155597 | A1 * | 7/2005 | Wolter | F21V 33/008 126/25 R |
| 2005/0223525 | A1 | 10/2005 | Wartian et al. | |
| 2006/0239754 | A1 * | 10/2006 | Dietz | B43K 29/10 401/131 |
| 2011/0222274 | A1 * | 9/2011 | Ko | F21L 4/00 362/220 |
| 2012/0212968 | A1 * | 8/2012 | Brown | A42B 1/24 362/396 |
| 2019/0001737 | A1 * | 1/2019 | Mullen | B43K 23/001 |

OTHER PUBLICATIONS

Machine translation of DE 202020101084 U1 retrieved from the FIT database of PE2E search. (Year: 2023).*

“Personalized Jumbo Size Magnetic Memo Clip with Pen Holder,” Proimprint.com. https://www.proimprint.com/Personalized-Jumbo-Size-Magnetic-Memo-Clip-With-Pen-Holder [Date accessed: May 3, 2021].

“Convenient self adhesive magnetic plastic clip pen holder,” alibaba.com. https://www.alibaba.com/product-detail/Convenient-self-adhesive-magnetic-plastic-clip_60543532122.html [Date accessed: May 3, 2021].

“EXPO Magnetic Clip Eraser w/3 Markers, Chisel, Black/Blue/Red, 1 Set SAN81503,” elitewarehouse.com. https://www.elitewarehouse.com/expo-san81503-95513-prd1.htm?productFeedId=0&utm_source=googleBaseFeed&utm_medium=shoppingEngine&utm_campaign=Google&source=productlistings293946777986&orign=pla&GPID=s&crid=354022659499&gclid=Cj0KCQjwvr6EBhDOARIsAPpqUPFP3QTdpND3412bW62TwLM6WFkwpHYs8upGSv1ZF5i7OPaw7U8ZNA8aAolsEALw_wcB [Date accessed: May 3, 2021].

* cited by examiner

SYSTEM AND METHOD FOR A MAGNETIC CLIP

CROSS-REFERENCE TO RELATED APPLICATIONS

This application claims priority to a prior-filed provisional application Ser. No. 63/233,124 filed on Aug. 13, 2021

FIELD OF DISCLOSURE

The overall field of this invention relates to hat accessories. More specifically, a hat accessory that provides a magnetic surface with a holding element and a light.

BACKGROUND

There are many different handheld accessories that are useful when it comes to day-to-day usage. For example, lights, a pen/pencil, pocket knives, Swiss army knives, etc. are typical handheld accessories that are easily portable and held in the pockets of the user during travels and day-to-day usage. A problem with existing accessories is that they may be difficult to carry/access alongside the user depending on the setting and situation. An objective of the present invention is to provide an accessory that attaches to headwear such as a baseball cap. The present invention is a magnetic accessory that provides a miniature light and a sleeve for a writing utensil such as a pen.

SUMMARY

The present invention is directed to an accessory that attaches to headwear such as a baseball cap. The present invention is a magnetic accessory that provides a miniature light and a sleeve for a writing utensil such as a pen. The present invention includes a fastening clip, a body, a magnetic plate, a magnetic plate, a magnetic tube, a magnetic sleeve, a set of arms or extendable elements and a miniature light.

BRIEF DESCRIPTION OF DRAWINGS

The present invention will be described by way of exemplary embodiments, which are meant to be illustrative but not restrictive as to the scope of the present invention, illustrated in the accompanying drawings in which like references denote similar elements, and in which.

DETAILED DESCRIPTION

Figure 1:
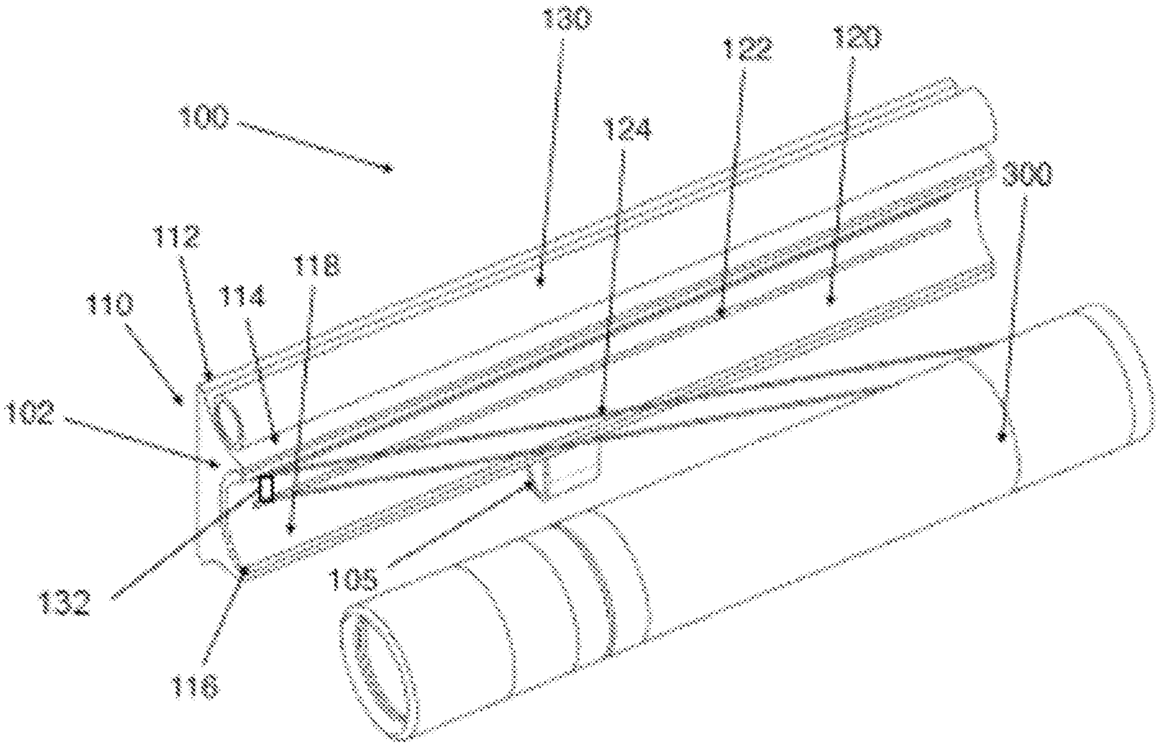
FIG. 1 is a front-top perspective view of the present invention with the light deployed.

In the Summary above and in this Detailed Description, and the claims below, and in the accompanying drawings, reference is made to particular features of the invention. It is to be understood that the disclosure of the invention in this specification includes all possible combinations of such particular features.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skills in the art that the invention may be practiced without these specific details. In other instances, well-known features have not been described in detail to avoid unnecessarily complicating the description.

In reference to FIG. 1, one embodiment of the magnetic clip of the present invention is shown. Magnetic clip 100 may be connected to a headwear 200. Headwear 200 may be a baseball cap or any number of headwear such as hard hats, top hats, visors, or any other article of clothing or object known by those ordinary skills in the art. Magnetic clip 100 may be customizable to accommodate many different types of attachments. Magnetic clip 100 may include a fastener 105 that provides a method of attachment to headwear 200. Magnetic clip 100 may be in a pivotable relationship with fastener 105 such that base 102 is able to rotate around fastener 105 such that magnetic clip 100 is positionable at various angles and orientations and can rotate 360 degrees about pivot 135.

Figure 2:
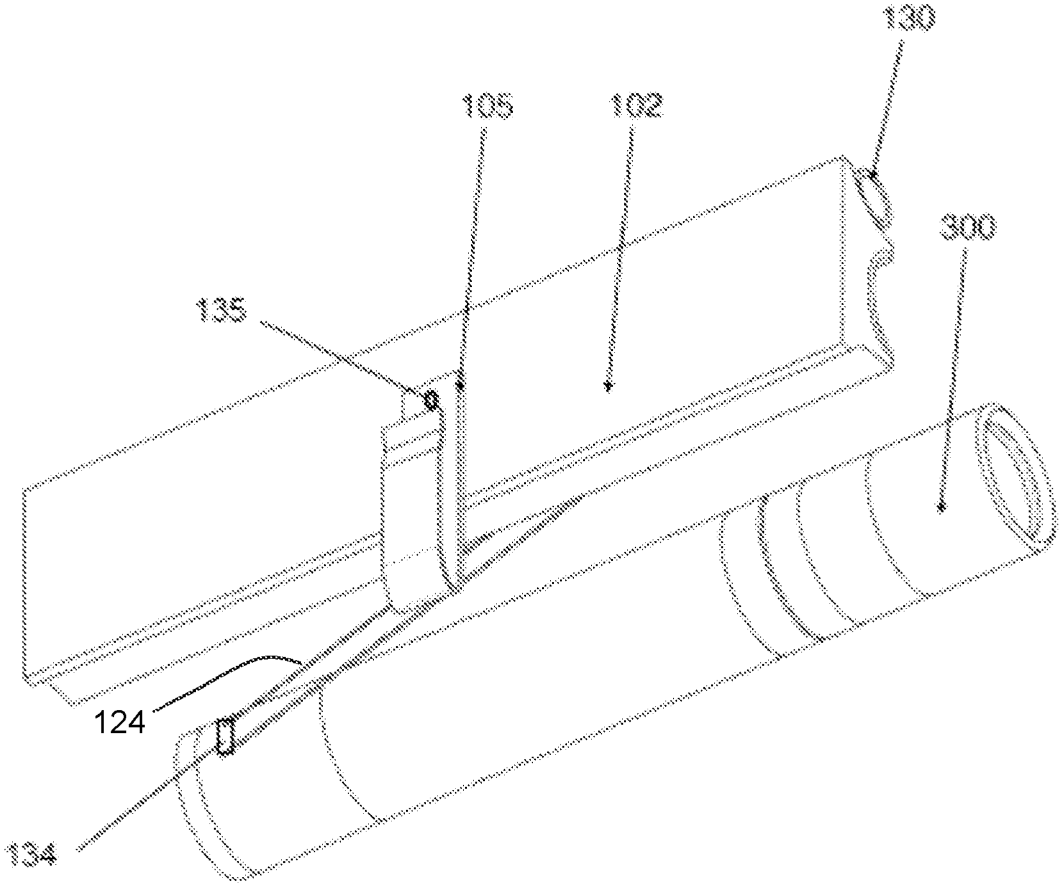
FIG. 2 is a rear-bottom perspective view of the present invention with the light deployed.
Figure 3:
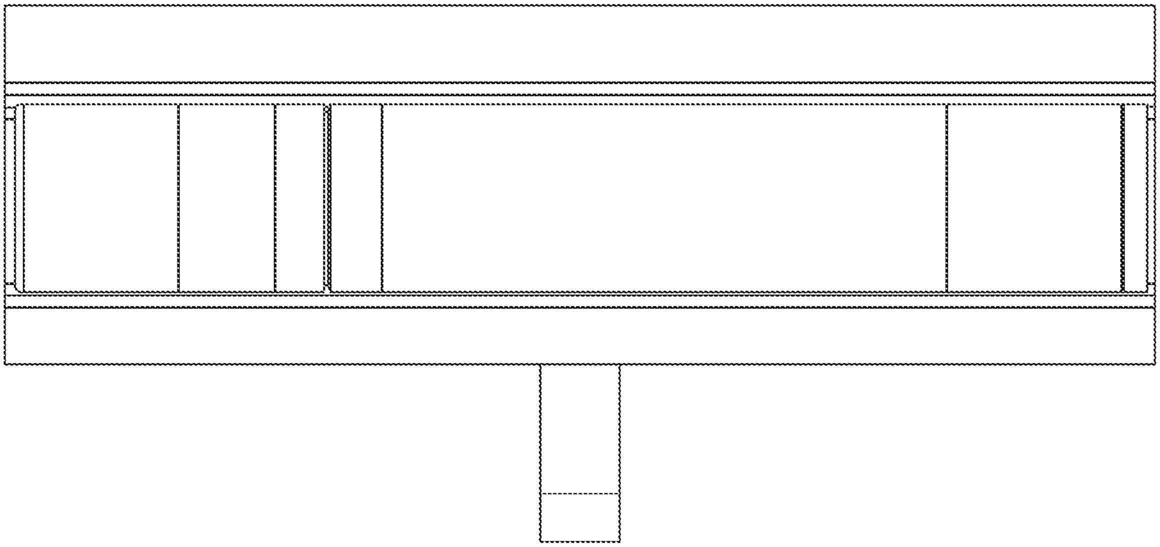
FIG. 3 is a front view of the present invention with the light deployed.
Figure 4:
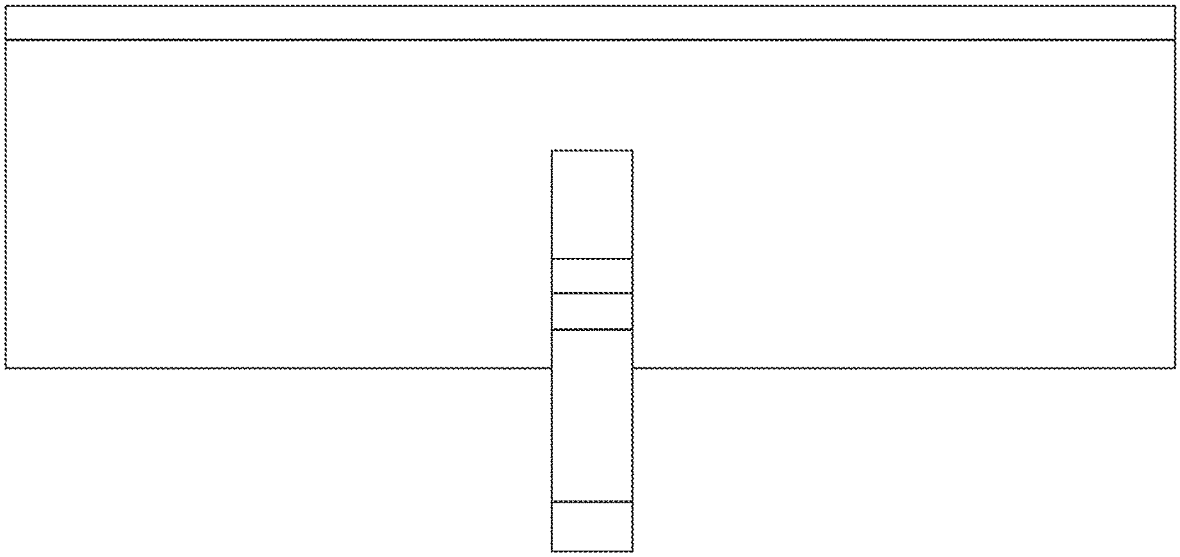
FIG. 4 is a rear view of the present invention with the light deployed.
Figure 5:
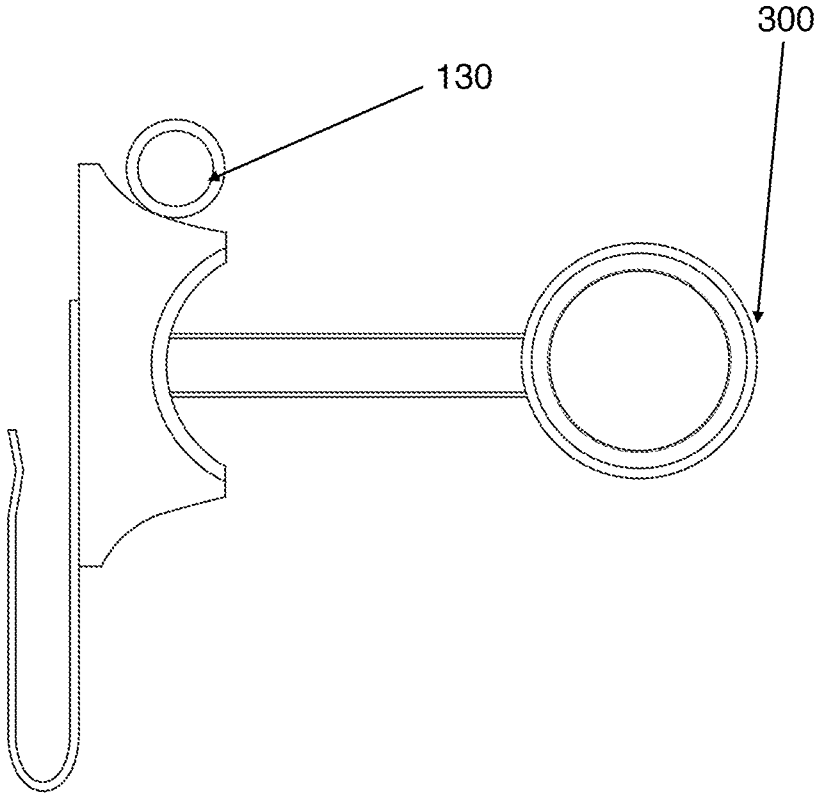
FIG. 5 is a left view of the present invention with the light deployed.

Fastener 105 may be positioned on any part of the hat such as the rear, the sides, or the brim of headwear 200. Fastener 105 may be elongated in shape extending vertically downward. Fastener 105 may be made of a material that is folded over on itself creating a thin u-shape for a clip-like structure as can be seen in FIG. 2. Fastener 105 may be made of any material such as metal, plastic, wood, rubber, or other composites. Fastener 105 may be of different forms, shapes, lengths, and widths. In other non-limiting embodiments magnetic clip 100 may be attached to headwear 200 by any number of other fasteners such as hinges, latches, adhesive, Velcro®, or any other suitable fastener.

Fastener 105 may have a lining to provide fastener assistance. The fastener assistance can be found in different forms such as an adhesive/frictional surface such as rubber, a screw-down, a clamp, or other configurations known by those of ordinary skill in the art.

Magnetic clip 100 may include a base 102 made completely or partially of a magnetic material, metal, a ferromagnetic, or paramagnetic metal for attraction to magnetic objects as well as other material such as plastic and rubber with one or more metal or magnetic attachments whereby base 102 is used to attract and attach magnetic components such as the magnetic plate and the magnetic sleeve and light. Base 102 may be elongated in shape extending horizontally perpendicular to fastener 105. In some embodiments base 102 may be magnetic and the plate and sleeve may not be magnetic but may be attracted to base 102 but it should be understood that magnetic clip 100 has any combination of materials whereby a component on base 102 is connected to the various articles such as the magnetic sleeve, the magnetic plate, the magnetic tube, and the light. Base 102 may be extruded isosceles trapezoid in shape. However, this is non limiting and may be any suitable shape capable of receiving one or more attachments whereby it may be symmetrical or asymmetrical.

Base 102 may be symmetrical in shape and have a base surface 110 connected to fastener 105 by any number of fasteners such as hinges, latches, or adhesive whereby fasteners may extend along a length of the height of base surface 110. Base surface 110 may extend upward into two vertical surfaces 112 (when base surface 110 is orientated to be at the bottom of magnetic clip 100). Two vertical surfaces 112 may each extend inward into concave surfaces 114 with curves that point towards base surface 110. Concave surfaces 114 extend into two horizontal surfaces 116 that extend inward into a concave surface 118 with a curve pointed directly downward to base surface 110. In other non-limiting embodiments fastener 105 may be connected to base surface 110 by a twist locking mechanism where fastener 105 has circular component with one or more protrusions that fits into a circular receiving component of base surface with one or more stopping elements whereby circular component may be placed into the receiving component and then twisted in a circular motion so the protrusions line up with the stopping elements and are secured in place. Receiving component may have one or more latches also to hold protrusions into place until the need for fastener 105 released. In other non-limiting embodiments circular receiving component may be on fastener 105 and circular component on base surface 110.

Figure 12:
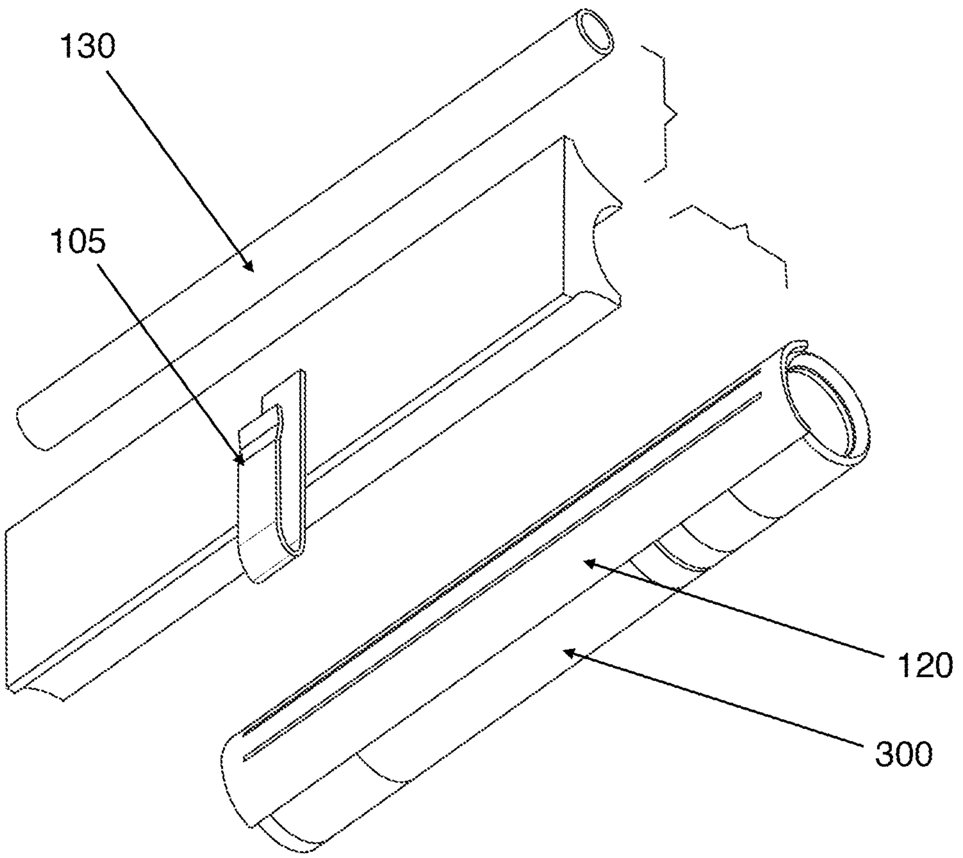
FIG. 12 a rear-bottom perspective view of the present invention in an exploded configuration.
Figure 13:
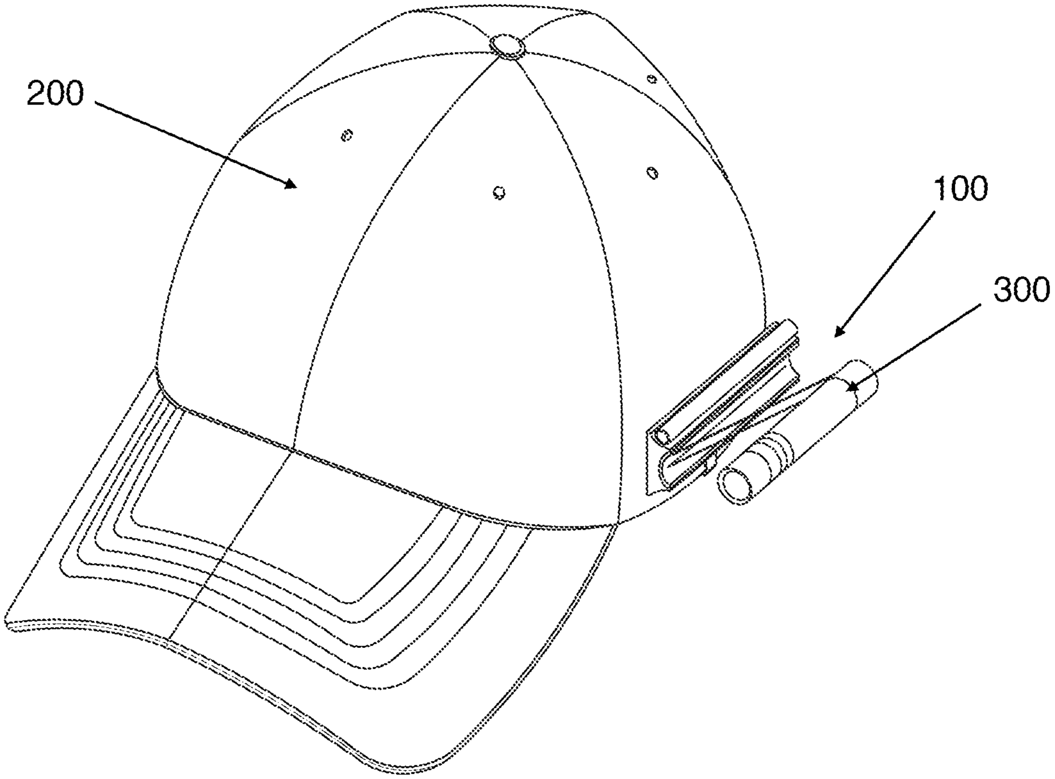
FIG. 13 is a supplemental view of the present invention attached to a baseball cap.

In reference to FIGS. 1 and 12 one embodiment of the magnetic plate is shown. Magnetic plate 120 is a thin plate that takes the shape of a partial curve of a circle. Magnetic plate 120 plate may be made out of metallic/magnetic material to allow the attachment to base 102 whereby magnetic plate 120 may be positioned into concave surface 118. It should be understood that magnetic plate 120 may be made of different material and does not necessarily need to be made of metallic/magnetic material. For example, magnetic plate 120 may be made of plastic with magnetic straps on the exterior or magnets embedded within the plastic material of magnetic plate 120. Magnetic plate 120 may include a set of grooves 122 or recesses that houses a set of arms 124. In one embodiment, grooves 122 may be fissures or holes on magnetic plate 120 that houses the set of arms 124. Furthermore, on the front side of magnetic plate 120 which light 300 attaches to, there may be additional fastening mechanism to further enhance and assist the fastening of a miniature light.

Figure 6:
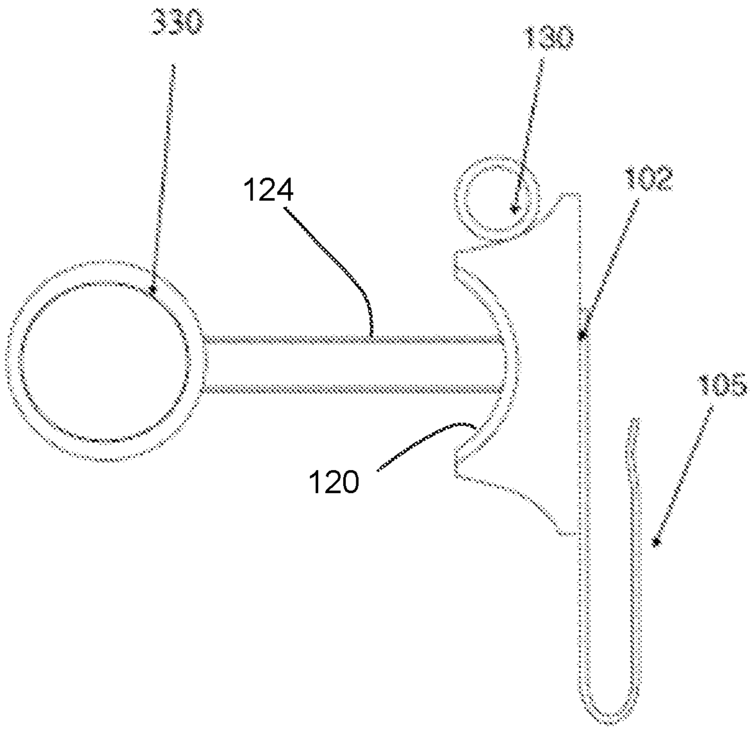
FIG. 6 is a right view of the present invention with the light deployed.
Figure 7:
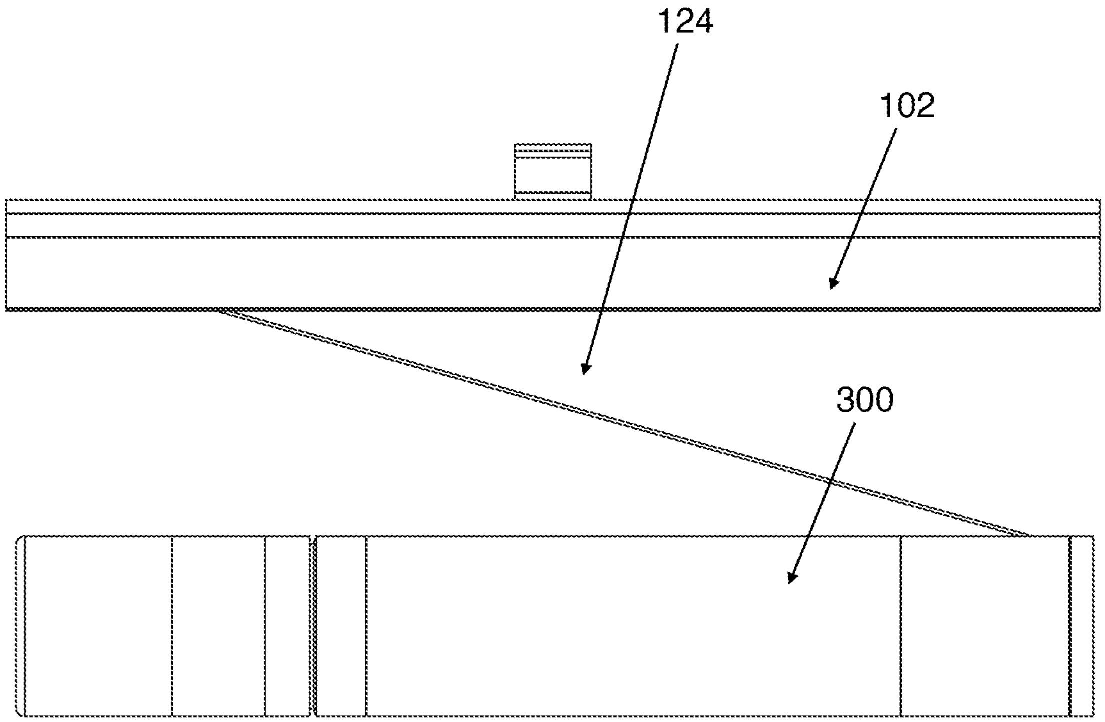
FIG. 7 is a bottom view of the present invention with the light deployed.
Figure 8:
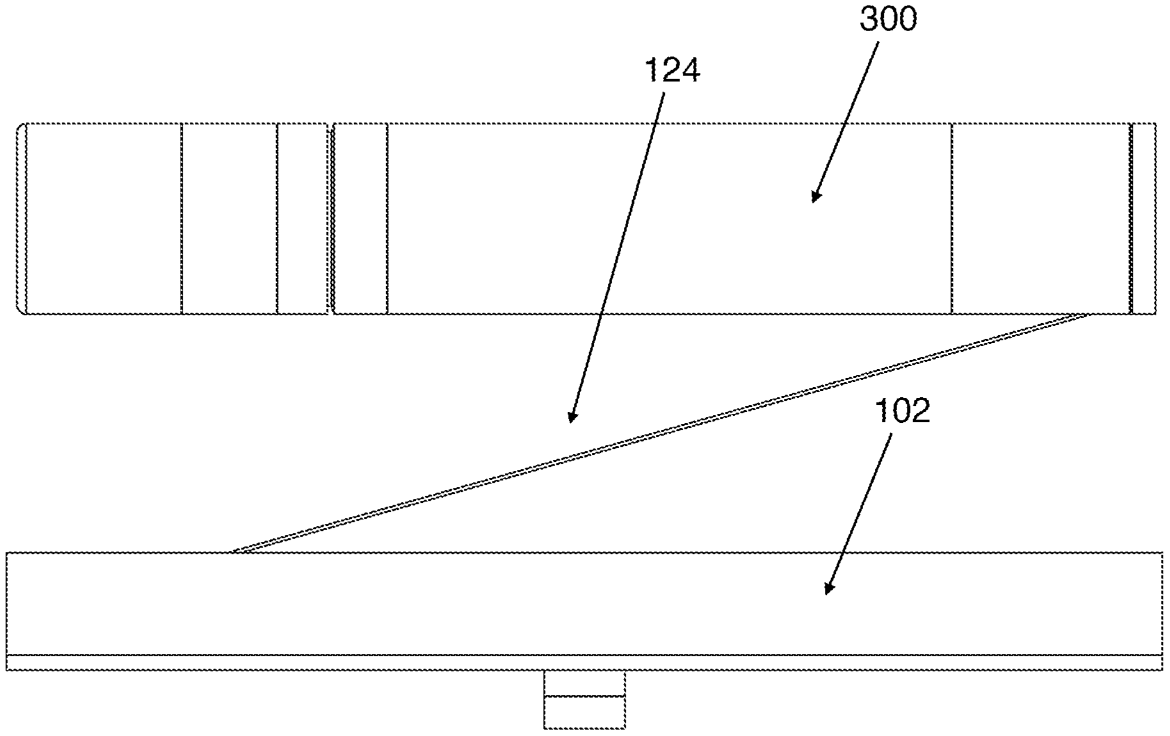
FIG. 8 is a top view of the present invention with the light deployed.
Figure 9:
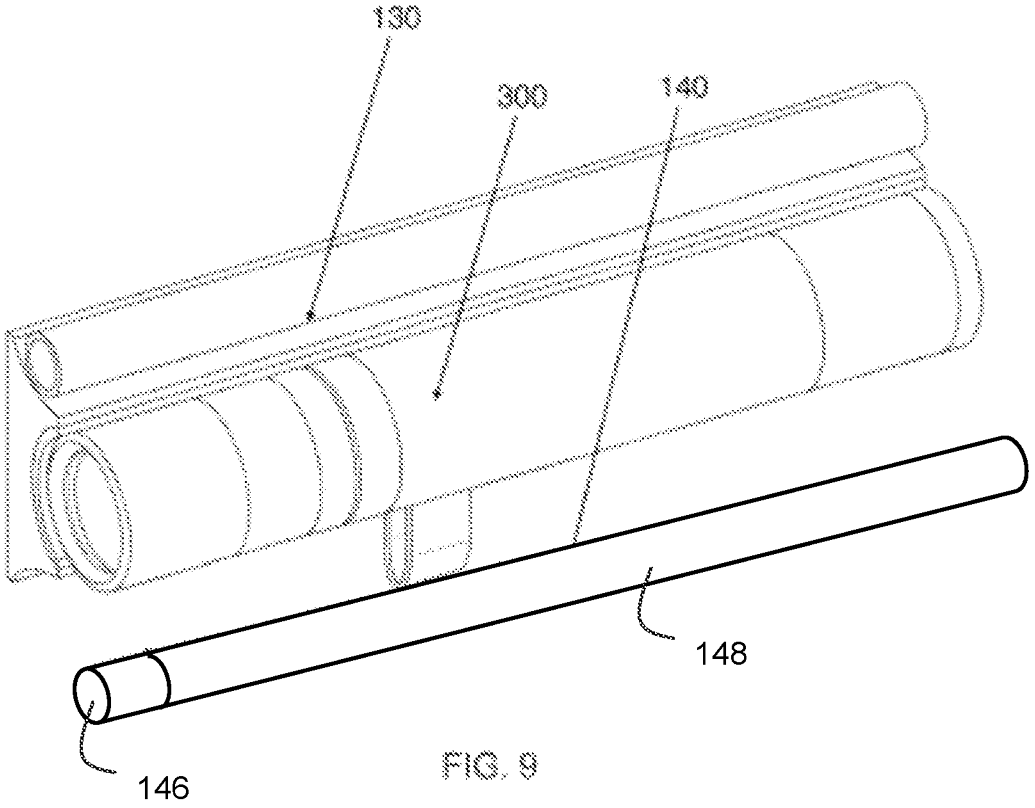
FIG. 9 is a front-top perspective view of the present invention in a collapsed position.
Figure 10:
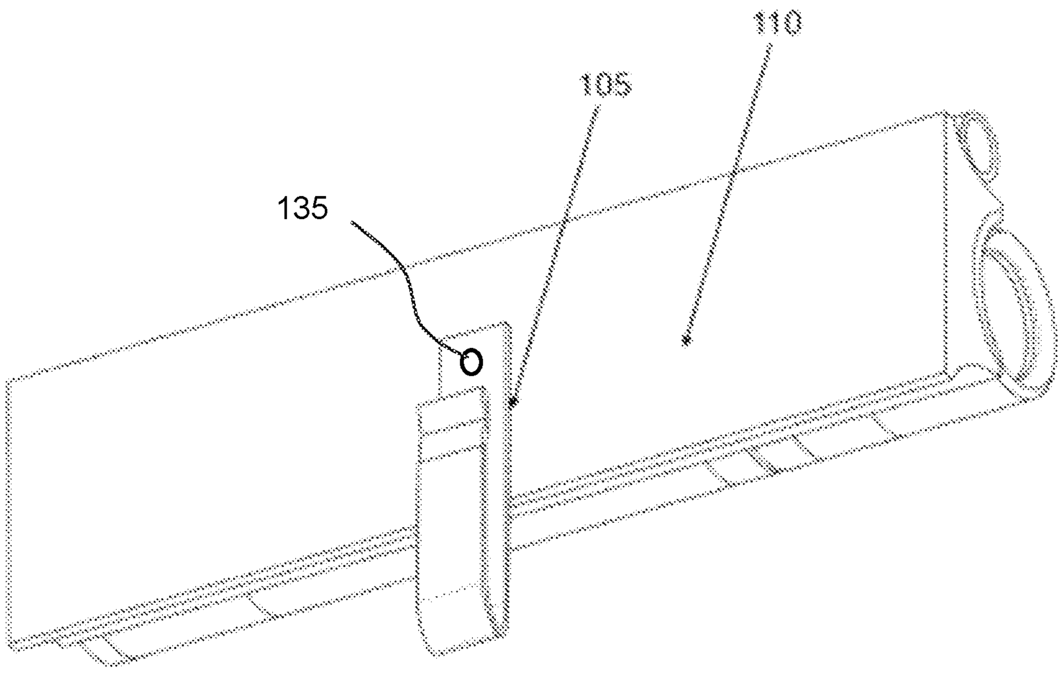
FIG. 10 is a rear-bottom perspective view of the present invention in a collapsed position.
Figure 11:
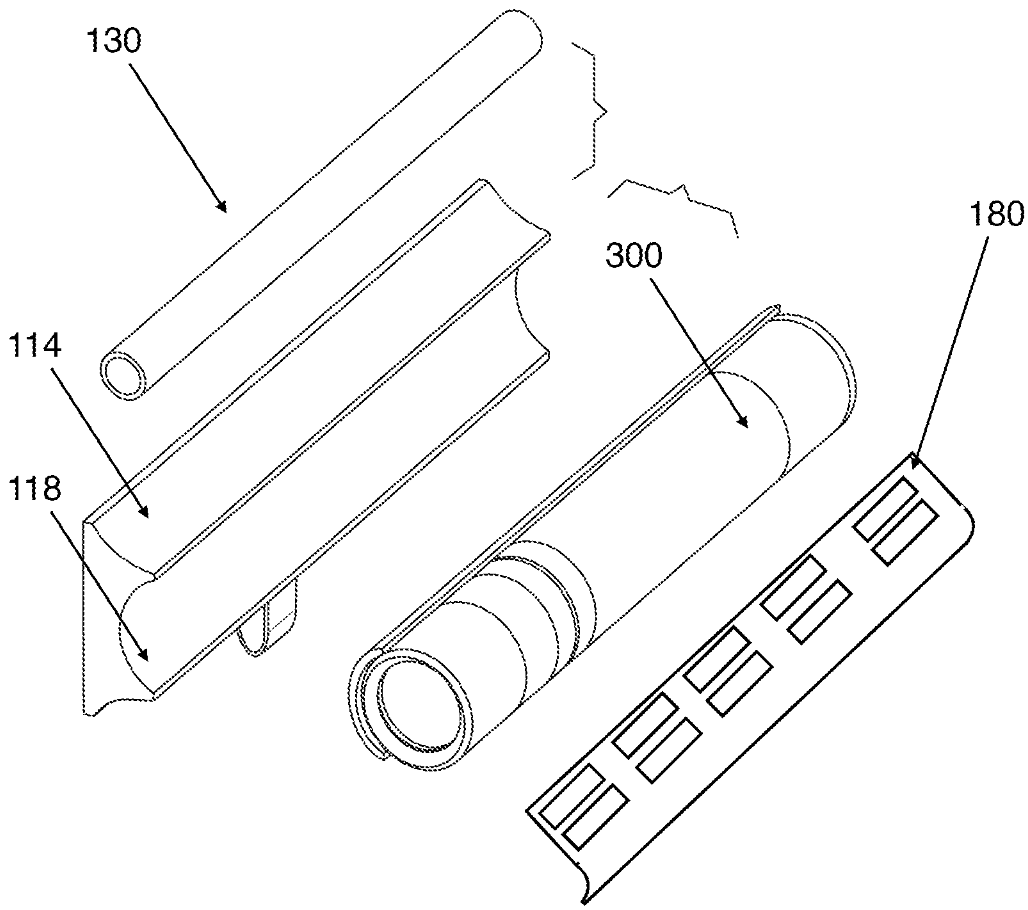
FIG. 11 is a front-top perspective view of the present invention in an exploded configuration.

In reference to FIGS. 1, 5, 6, and 9, one embodiment of the magnetic sleeve 130 can be seen. Magnetic sleeve 130 may be an elongated hollow cylinder with open ends at opposite sides of the cylinder. Magnetic sleeve 130 may be made out of a metallic/magnetic material to allow the attachment to base 102 whereby magnetic sleeve 130 is positioned into either concave surface 114. It should be appreciated that in some embodiments, as illustrated in FIG. 6, there may be multiple magnetic sleeves 130, 330 positioned into concave surfaces 114 and 118.

Note that magnetic sleeve 130 may be made of different material and does not necessarily need to be made of metallic/magnetic material. For example, magnetic sleeve 130 may be made of plastic/rubber or flexible, stretchy, or elastic material with magnetic straps on the exterior or magnets embedded within the plastic/rubber material of the plate. In one embodiment, magnetic sleeve 130 provides the ability to attach external cylindrical or prism shaped objects onto the present invention. Within different embodiments, magnetic sleeve 130 may take a different shape and form. For example, the magnetic sleeve may instead be magnetic straps that attach to external accessories such as a pen. The magnetic straps adhere to the external accessory such as a pen and allow for magnetic attraction and attachment to base 102 whereby the magnets may be positioned in any arrangement to any of the components.

In one or more embodiments, a magnetic tube 140 may be positioned in concave surfaces 114 opposite of magnetic sleeve 130 whereby magnetic tube 140 may have a similar configuration and connection to base 102 as magnetic sleeve 130 and hold various items useful for the circumstances at hand such as drill bits or medicine or other needed items. Magnetic tube may have a cylindrical body 148 with a twistable top 146 or screw on top 146 or any type of removable connection that may be removed from the cylindrical body so that items such as matchsticks may be stored inside of the cylindrical body 148. Magnetic tube 140 may be made plastic with metal/magnets embedded in the exterior. In one or more embodiments the body of magnetic tube 140 may have a receiving element or may be magnetically attracted to the lid 146 at various points such that the lid 146 may still be connected to magnetic tube 140 or base 102 such that the lid 146 will not be lost.

Figure 14:
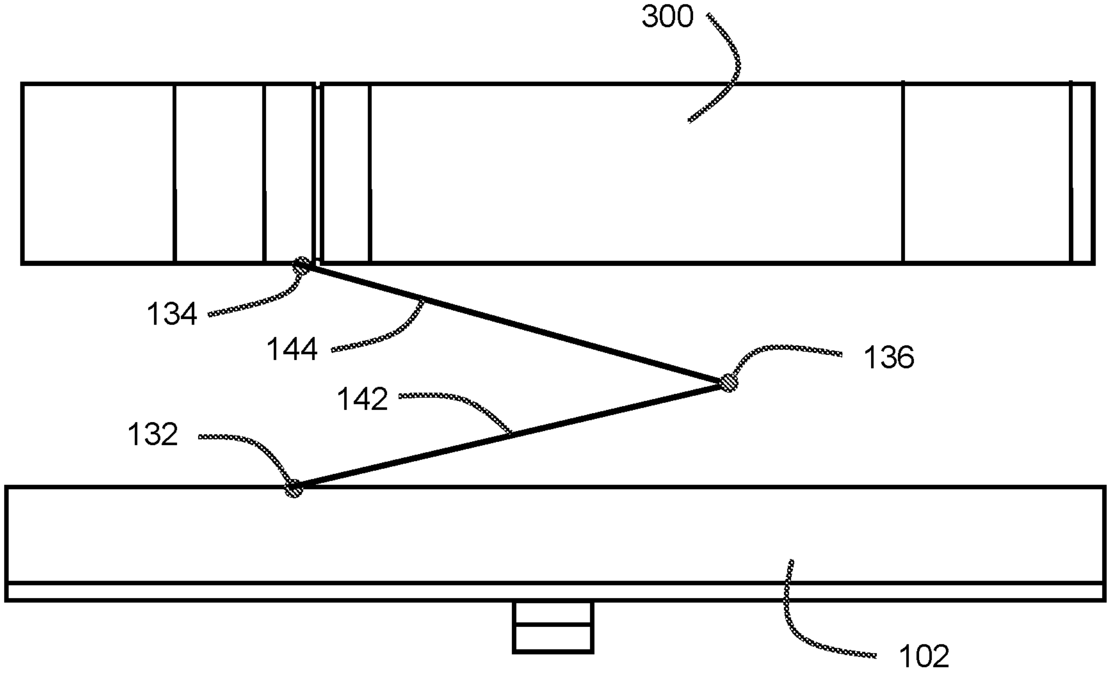
FIG. 14 is a top view of another embodiment of the invention with the light deployed.

In reference to FIGS. 1, 2, 5, 6, 7, and 8, the set of arms 124 of the present invention can be seen. Set of arms 124 is designed to be the component that connects light 300 and magnetic plate 120 together. Light 300 may be detachable from set of arms 124. Set of arms 124 may be positioned within grooves 122 of magnetic plate 120 and have a first arm connected to a second arm by a hinge at the end or any other location for light 300 to be extended outward and manipulated into multiple orientations. Set of arms 124 may be removed from grooves 122 and then reinserted such that they are facing the other way which is useful for orientating magnetic clip 100 on different sides of the hat. In some non-limiting embodiments, there may be different versions that are suitable for different orientations. Set of arms 124 may be sturdy and flexible to allow mobility of the miniature light. Set of arms 124 may be manipulated into different forms and shapes desired by the user. Set of arms 124 may include any number of connected arms such as a first arm connected to a second arm at their ends by any number of fasteners such that they are a hinged relationship allowing light 300 to be extended outward away from base 102 at different distances or resting in concave surface 118 when set of arms 124 are stored into grooves 122. For example, FIG. 14 illustrates a set of two arms with first arm 142 hinged to base 102 with first hinge 132, second arm 144 hinged to light 300 with second hinge 134, and the opposite ends of arms 142, 144 hinged together with third hinge 136, thus allowing light 300 to be extended away from base 102. Within a non-limiting embodiment, set of arms 124 may be attached to base 102 instead of magnetic plate 120 in cases where the magnetic plate does not exist.

In reference to FIG. 1 through 13, a miniature light 300 of the present invention is shown. Light 300 may be a handheld device that provides light. Light 300 takes the shape of a cylindrical body or any number of prisms. Set of arms 124 connect to a bottom side of light 300 which connects light 300 to magnetic plate 120 whereby light 300 may be in a hinged relationship connection with set of arms 124 using one or more fasteners such that light 300 may be angled to point upward or downward or otherwise rotated or positioned at any angle for 360 degrees projecting. In some non-limiting embodiments, light 300 may be positioned into another magnetic sleeve 330. Magnetic sleeve 330 may be lined with a material that's spongy/conforming in order to grip the light 300 securely when in magnetic sleeve 330.

During use, the user will attach magnetic clip 100 onto the side of a headwear that is to be worn. The user will utilize fastener 105 to slide and attach onto headwear 200. Once the magnetic clip 100 is attached to the headwear 200, the user may reach and lift miniature light 300 off the surface of magnetic plate 120. The user will point miniature light 300 to their desired direction to provide themselves light in an area needed. Set of arms 124 will provide a wide range of mobility for light 300 as well as limit the positioning of light 300 to close vicinity of magnetic clip 100. When the user is finished with using light 300, the user will position light 300 onto magnetic plate 120 accordingly such that set of arms 124 fall within the set of grooves 122 to assist the securement of light 300 onto magnetic plate 120. To use magnetic sleeve 130, the user will lift magnetic sleeve 130 from base 102, insert a cylindrical tool such as a pen, pencil, or of the likes. When a cylindrical device is inserted into magnetic sleeve 130, the user will place magnetic sleeve 130 against any portion of base 102 which the magnetic forces attract and attach together. Magnetic sleeve 130 may provide the user easy access to their cylindrical tool that has been fastened onto magnetic clip 100.

In other non-limiting embodiments base 102 may instead be connected to a separate magnetic plate 180 instead of magnetic sleeve 130. Magnetic plate 180 may be any size but in a preferred embodiment may be a small, rectangular, vertical surface with a plurality of magnets embedded. Similar to the base 102, magnetic plate 180 may be made of a lightweight material and would be used, for example, to temporarily stick screws as you use them, rather than trying to set them down somewhere and have them roll off. As discussed with every other component in the system, magnetic plate 180 may be made of any material that can be connected with a magnetic attraction or parts of magnetic plate 180 may be composed of material for magnetic attraction.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the below claims.

What is claimed is:

1. A magnetic clip for attachment on clothing or headwear, the magnetic clip comprising:
- a base for receiving magnetic attachments; and
- a fastener for connecting the base to the clothing or the headwear;
- wherein the base is rotatable in a first plane from 0 to 360 degrees with respect to an orientation of the fastener in a second plane parallel to the first plane; and wherein the base has one or more concave surfaces to receive the magnetic attachments;
- a set of arms hinged to the base with a first hinge, wherein the set of arms can reside parallel to the base or pivot to reside at an angle with respect to the base;
- a magnetic, elastic sleeve connected to the distal end of the set of arms; and
- a light held in the magnetic, elastic sleeve.

2. The magnetic clip of claim 1, wherein the fastener is a u-shaped clip, and the u-shape defines the orientation of the fastener in the second plane.

3. The magnetic clip of claim 1, wherein the base is magnetic.

4. The magnetic clip of claim 1, wherein the base has a base surface that extends into two vertical surfaces that each extend inward into first concave surfaces of the one or more concave surfaces with curves that point towards the base surface wherein the first concave surfaces extend into two horizontal surfaces that extend inward into a second concave surface of the one or more concave surfaces with a curve pointed directly downward to the base surface.

5. The magnetic clip of claim 1, further comprising a magnetic plate wherein the magnetic plate is positionable into a concave surface of the one or more concave surfaces.

6. The magnetic clip of claim 5, wherein the magnetic plate is curved in shape.

7. The magnetic clip of claim 6, wherein the magnetic plate has one or more grooves.

8. The magnetic clip of claim 7, wherein the set of arms can reside parallel to the base or pivot to reside at an angle with respect to the base and can be positioned into the one or more grooves in a first configuration and extend outward from the one or more grooves in a second configuration.

9. The magnetic clip of claim 1, wherein the set of arms comprises a first arm comprising a first end with the first hinge and a second end, and a second arm comprising a first end and a second end, and having a second hinge at the second end of the first arm and the first end of the second arm wherein the second hinge connects the first arm and the second arm.

10. The magnetic clip of claim 9, further comprising a light connected to the second end of the second arm with a third hinge.

11. A magnetic clip for attachment on clothing or headwear, the magnetic clip comprising:
- a base capable of linking to attachments by a magnetic connection, the base having first concave surfaces and a second concave surface for receiving the attachments;

a fastener for connecting the base to the clothing or headwear; and a set of arms hinged to the base with a first hinge, wherein the set of arms can reside parallel to the base or pivot to reside at an angle with respect to the base; and further comprising a magnetic, elastic sleeve connected to the distal end of the set of arms, and a light held in the magnetic, elastic sleeve.

12. The clip of claim 11, further comprising a light removably connected to the base.

13. The clip of claim 11, wherein the set of arms comprises a first arm comprising a first end with the first hinge and a second end, and a second arm comprising a first end and a second end, and having a second hinge at the second end of the first arm and the first end of the second arm wherein the second hinge connects the first arm and the second arm.

14. The clip of claim 13, further comprising a light connected to the second end of the second arm with a third hinge.

15. The clip of claim 14, further comprising a sleeve as one of the attachments for holding an item within.

16. The clip of claim 15, further comprising a tube as another of the attachments with a removable lid for holding a second item within.

17. A clip for attachment on clothing, the clip comprising:

a base capable of linking to attachments by a magnetic connection, the base having first concave surfaces and a second concave surface for receiving the attachments and a fastener for connecting the base to the clothing;

a light removably connected to the base;

a set of arms connected to the light for extension of the light outward from the base, wherein the light is in a pivotable relationship with the set of arms; grooves, wherein the set of arms is positioned into the grooves in a first configuration and extends outward from the grooves in a second configuration;

a sleeve as one of the attachments for holding an item within;

a tube as another of the attachments with a removable lid for holding a second item within; and wherein the sleeve is positioned into one of the first concave surfaces and the tube is positioned into another of the first concave surfaces, wherein the light is positioned in the second concave surface wherein the base has a base surface connected to the fastener, wherein the base extends into two vertical surfaces that extend inward into the first concave surfaces with curves that point towards the base surface, and wherein the first concave surfaces extend into two horizontal surfaces that extend inward into the second concave surface with a curve pointed directly downward to the base surface.

* * * * *